United States Patent [19]

Widmer

[11] 3,980,826
[45] Sept. 14, 1976

[54] MEANS OF PREDISTORTING DIGITAL SIGNALS
[75] Inventor: Albert Xavier Widmer, Katonah, N.Y.
[73] Assignee: International Business Machines Corporation, Armonk, N.Y.
[22] Filed: Oct. 24, 1975
[21] Appl. No.: 625,621

Related U.S. Application Data
[63] Continuation of Ser. No. 396,964, Sept. 12, 1973, abandoned.

[52] U.S. Cl.............................. 178/68; 325/38 A; 325/42
[51] Int. Cl.² .................................. H04L 27/02
[58] Field of Search............... 325/38 R, 38 A, 41, 325/42, 62, 65; 333/18 R, 28; 328/155, 165; 178/DIG. 3, 68, 66 R, 67

[56] References Cited
UNITED STATES PATENTS
3,311,442  3/1967  DeJager et al......................... 325/42
3,801,911  4/1974  von Horsten ..................... 325/38 A
3,806,807  4/1974  Nakamura ............................ 178/68
3,919,476  11/1975  Torpie ................................. 178/68

Primary Examiner—Benedict V. Safourek
Attorney, Agent, or Firm—Sughrue, Rothwell, Mion, Zinn and Macpeak

[57] ABSTRACT

A method and means for transmitting a waveform of mixed frequency content over a transmission line in a way to minimize distortion are disclosed. The specific application relates to a bifrequency or biphase encoded binary data transmission system. Distortion is minimized by reducing the low frequency content of the signal which results in less phase shift error per unit distance. This is accomplished by distinguishing bits encoded at the lower frequency of the bifrequency encoded data and then reducing the amplitude of the low frequency bits to a relatively small fraction of their initial amplitude during the latter portion of each of the bit periods.

7 Claims, 18 Drawing Figures

REGULAR DRIVER OUTPUT
INTO 100 Ω LINE

PREDISTORTED DRIVER OUTPUT
INTO 100 Ω LINE

REGULAR SIGNAL AFTER
1000' AWG 24 LINE

PREDISTORTED SIGNAL AFTER
1000' AWG 24 LINE

REGULAR SIGNAL AFTER
2000' AWG 24 LINE

PREDISTORTED SIGNAL AFTER
2000' AWG 24 LINE

REGULAR SIGNAL AFTER
3000' AWG 24 LINE

PREDISTORTED SIGNAL AFTER
3000' AWG 24 LINE

REGULAR SIGNAL AFTER
4000' AWG 24 LINE

PREDISTORTED SIGNAL AFTER
4000' AWG 24 LINE

REGULAR SIGNAL AFTER
5000' AWG 24 LINE

PREDISTORTED SIGNAL AFTER
5000' AWG 24 LINE

MEANS OF PREDISTORTING DIGITAL SIGNALS

This is a continuation of application Ser. No. 396,964, filed Sept. 12, 1973 (now abandoned).

BACKGROUND OF THE INVENTION

1. Field of the Invention

This invention relates to data transmission systems, and more particularly to a bifrequency encoded binary data transmission system wherein the transmitted signal is predistorted to eliminate the need for equalization at the receiving end.

2. Description of the Prior Art

The distance over which an information carrying signal can be transmitted by a transmission line is limited primarily by two factors: (1) the signal to noise ratio of the transmission, and (2) the phase distortion introduced by the transmission line. Increasing the signal to noise ratio of the transmission is relatively easily accomplished. On the other hand, transmission line induced phase distortion is a more difficult problem since, even with a good signal to noise ratio, detection of the information may be possible only after complex transformation of the received signal. In a bifrequency encoded binary data transmission system, an oscillograph of the transmitted signal reveals a characteristic pattern of two repeating small "eyes" each of which represents a half-bit period. The receiver gates on the center of these eyes for detection of the signal and on the level transitions for synchronization. Phase distortion which is a function of increasing line length has the effect of closing or causing the disappearance of these eyes with the result that detection of the signal is impossible.

In order to overcome the effects of phase distortion over long lines, it is known to provide an equalizer or filter at the end of the transmission line. The purpose of the equalizer is to introduce an inverse distortion to compensate for the transmission line distortion. But, since the line distortion is a function of line length or distance, the equalizer must be tuned to the distance. This means that any change in line length effectively requires a redesign of the equalizer or an automatic equalizer. In addition to the inflexibility of equalizers, they have the additional disadvantage of being expensive to fabricate.

SUMMARY OF THE INVENTION

It is therefore an object of this invention to eliminate the need for equalization at the receiving end of a binary data transmission system.

It is another object of the invention to generate a bifrequency encoded binary data signal which can be readily detected at any distance up to a given maximum without any change in the sending or receiving circuitry.

It is a further object of the invention to extend the distance over which bifrequency encoded binary data signals can be transmitted without sacrificing short distance or direct-coupled transmission performance which is both very inexpensive and easily fabricated.

According to the present invention, the foregoing and other objects are attained by reducing the low frequency content of the transmitted signal in the line driver. This is done by lowering the amplitude of the second half of the long pulses to a value typically about one quarter or less of peak value. Since each frequency propagates at a different speed and each has different amounts of attenuation per unit distance of transmission line, the resulting narrowing of the band width has the effect of reducing distortion due to phase shift error. This does not significantly affect signal detection on short lines and drastically reduces signal distortion on longer lines thereby simplifying receiver design.

Implementation of the invention is quite simple and inexpensive using the techniques of modern technology. Logic circuitry is used to detect whether two consecutive half-bit intervals are equal. Two equal half-bit intervals represent a long pulse, and the logic causes the drive level to be lowered in the second half of the long pulse.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENT

In a bifrequency encoded binary data transmission system, the suitability of a received signal is judged based on two main aspects:

1. At the receiving end the eye of the signal must open enough to allow reliable determination of the signal polarity, since the signal is sampled near the center of the eye.

2. Pattern dependent timing jitter in the received signal should be as small as possible; that is, the transitions through the zero level in the received signal should occur within a small time interval for both short and long pulses.

Figure 1:
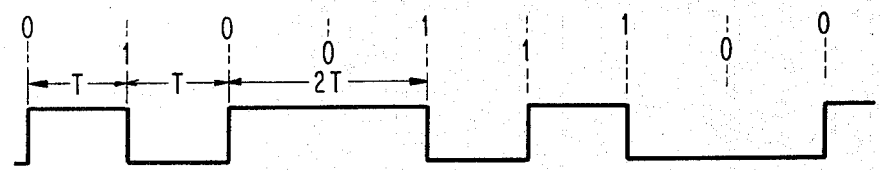
FIG. 1 illustrates a bipolar waveform consisting of short and long pulses.

FIG. 1 of the drawings illustrates a typical bipolar waveform consisting of short and long pulses. For purposes of illustration, the long pulses are considered to have a period 2T and the short pulses have a period equal to T. FIG. 1 illustrates two possible code assignments. Thus, for example, two short pulses may represent a binary 1, and one long pulse may represent a binary 0. On the other hand for what is commonly referred to as the biphase code, a binary 1 may be represented by the transition from a positive to a negative pulse level in the middle of a bit period, while a binary 0 may be represented by the negative to positive transition of the pulse level inn the middle of a bit period. The code assignment is, however, irrelevant with respect to the present invention since the waveforms have identical features.

Figure 2:
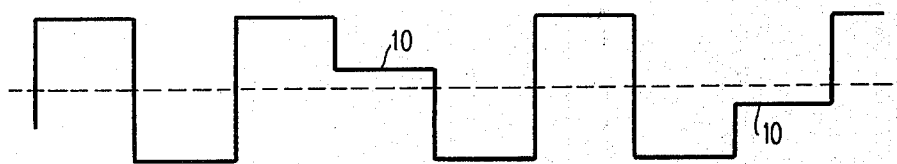
FIG. 2 illustrates a predistortion of the bipolar waveform wherein the second half of all long pulses is transmitted at a reduced level.
Figure 3:
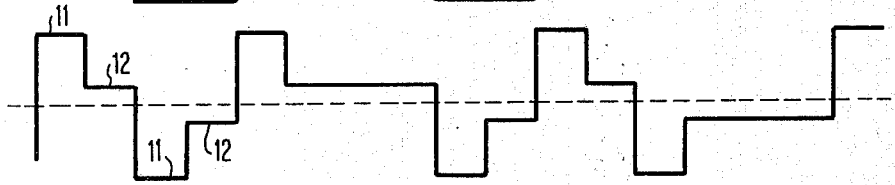
FIGS. 3 and 4 illustrate bipolar waveforms predistorted so that the trailing end of every pulse is lowered, the difference in the predistortion illustrated in the two Figures residing in the time at which the amplitude level of the pulses is lowered.
Figure 4:
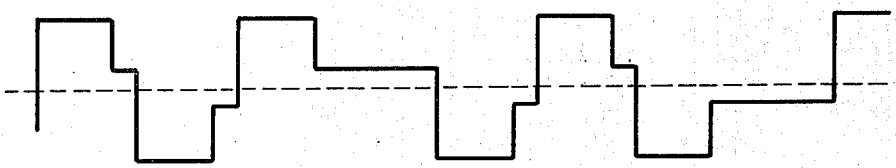

Given the bipolar waveform of FIG. 1, it may be predistorted before transmission over a transmission line according to any one of the waveforms shown in FIGS. 2, 3 or 4. In the waveform shown in FIG. 2, the second half of all long pulses is transmitted at a reduced level indicated in the Figure by the drop in amplitude at the reference numerals 10. In the waveforms illustrated in FIGS. 3 and 4, the trailing end of every pulse is lowered. In the waveform of FIG. 3, the transition from the high level 11 to the low level 12 occurs at every time T/2 after a polarity change in the original waveform illustrated in FIG. 1. In the waveform illustrated in FIG. 4, the level change occurs at time 3T/4.

In general, the waveforms of FIGS. 2, 3 and 4 are more costly to implement in the order described. Selection of any one waveform depends on the application. The bipolar waveform illustrated in FIG. 1 is suitable only for relatively short distances. The waveform of FIG. 2 roughly doubles the range; however, both of the waveforms illustrated in FIGS. 1 and 2 generate considerable pattern dependent timing jitter at most distances. Thus, in applications with chains of repeaters, the waveforms illustrated in FIGS. 3 and 4 are preferred choices, since they show very little timing jitter at any distance up to the maximum. The relatively narrow peak pulse of the waveform illustrated in FIG. 3 suffers slightly more attenuation than wider pulses, but the waveform illustrated in FIG. 4 is a little more complex to implement.

Once a waveform has been selected, the optimum high and low levels may be determined from the following procedure. The peak amplitude is chosen such that a sequence of all short pulses results in a readily detectable signal at the end of a maximum length of transmission line. Since attenuation on normal transmission lines is proportional to the square root of the frequency, the wide pulses suffer less attenuation due to their lower frequency spectrum. These wider pulses are weakened at the sending end by lowering their trailing amplitude enough, such that the amplitude of the wide pulses at the end of the maximum length line exceeds the amplitude of the short pulses by no more than about 20 to 50%.

In many cases it is desirable to adjust the amplitudes for minimum timing jitter. For predistorted waveforms the trailing transition of a wide pulse leads other transitions at distances up to a certain cross-over distance, where the two types of transitions coincide exactly. At distances beyond the cross-over point, the trailing transition of a wide pulse lags the other transitions. A higher peak to low amplitude ratio at the sending end will increase the timing lead for the short distances and decrease the lag for the maximum distances. The ratio could, therefore, be considered optimum if the maximum timing lead equals the maximum timing lag.

Figure 5:
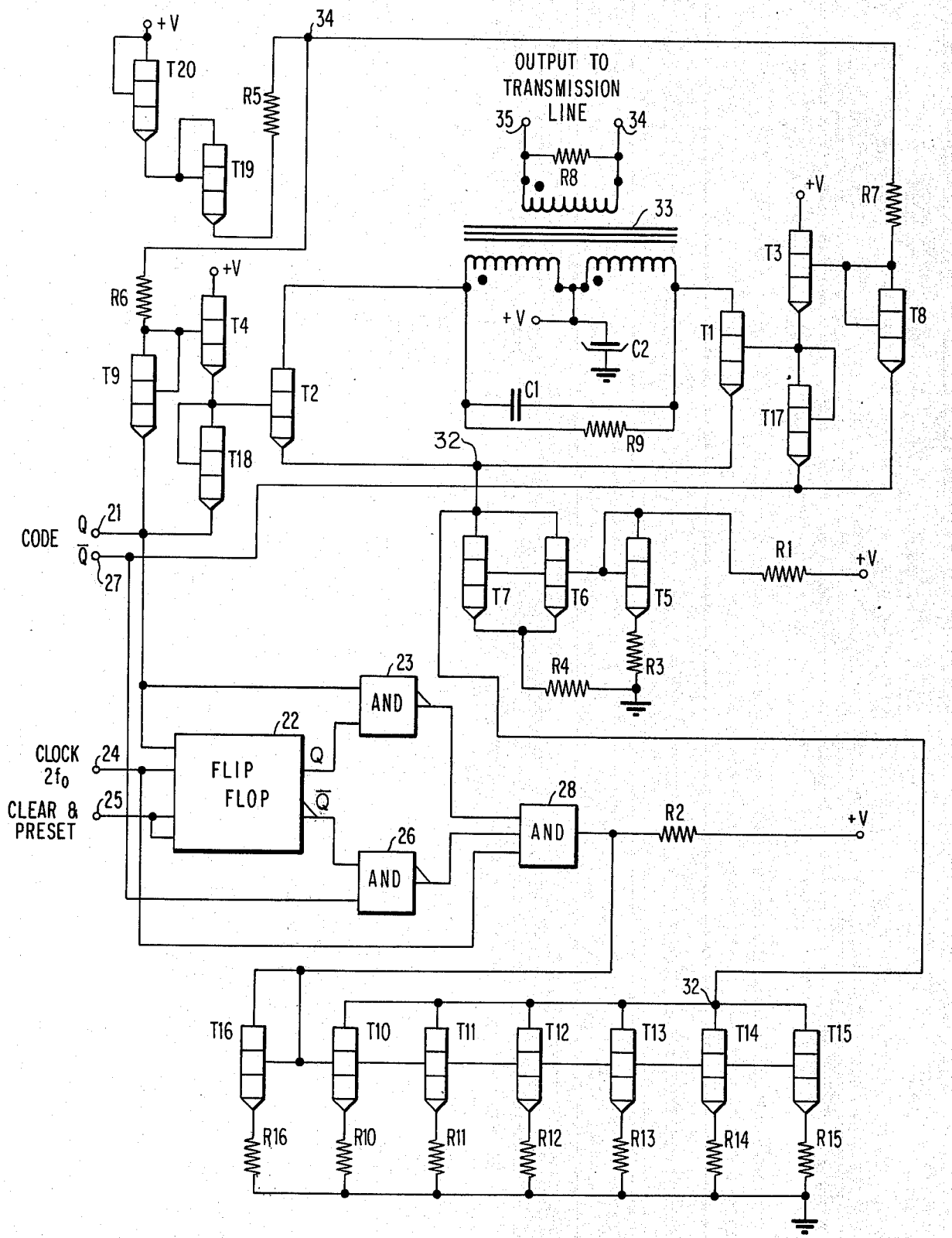
FIG. 5 is a logic and schematic diagram illustrating one embodiment for implementing the predistortion of a bipolar waveform according to the invention.
Figure 8A:
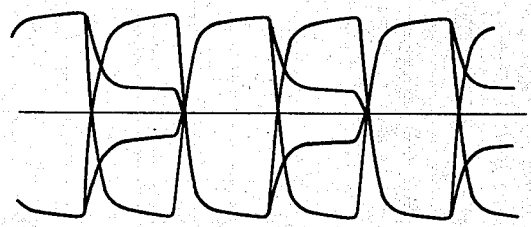
FIGS. 8a through 8f are illustrations of oscillographs of a bipolar waveform predistorted according to the teachings of the present invention at various lengths of a transmission line.
Figure 8B:
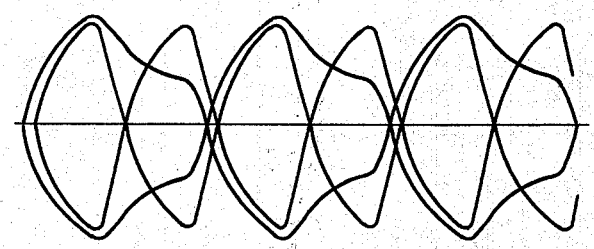
Figure 8C:
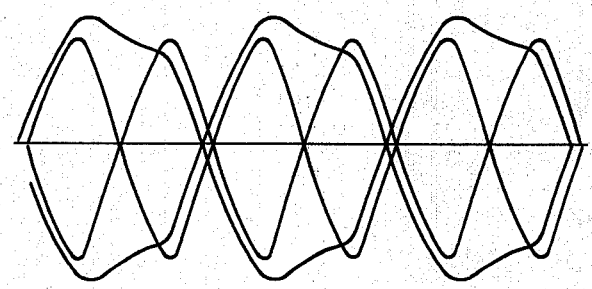
Figure 8D:
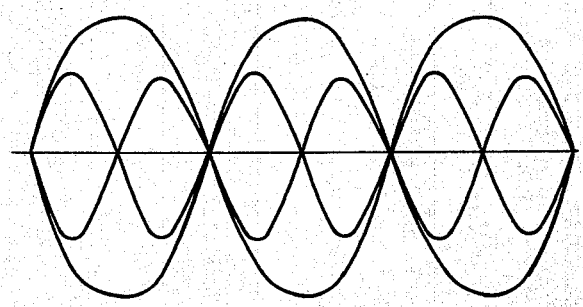

An apparaus for generating the waveform illustrated by FIG. 3, for example, is shown in FIG. 5. The bipolar waveform of FIG. 1, which may be denoted as code Q, is applied to the input terminal 21 which is connected to the enable or set input of flip-flop 22 and also to AND gate 23. A clock signal at a frequency of $2f_0$ is applied to terminal 24 which is connected to the trigger input of flip-flop 22. To initiate operation, a clear and preset signal can be applied to terminal 25 which is connected to the reset input of flip-flop 22. The true output of flip-flop 22 designated as Q is connected to the other input of AND gate 23. A second AND gate 26 is connected to receive the NOT true output of flip-flop 22 designated as Q̄. AND gate 26 also receives as an input the code Q̄ applied at terminal 27. The NOT or inverted outputs of AND gates 23 and 26 are applied as inputs to a third AND gate 28 which also receives the clock signal as an input.

Figure 6:
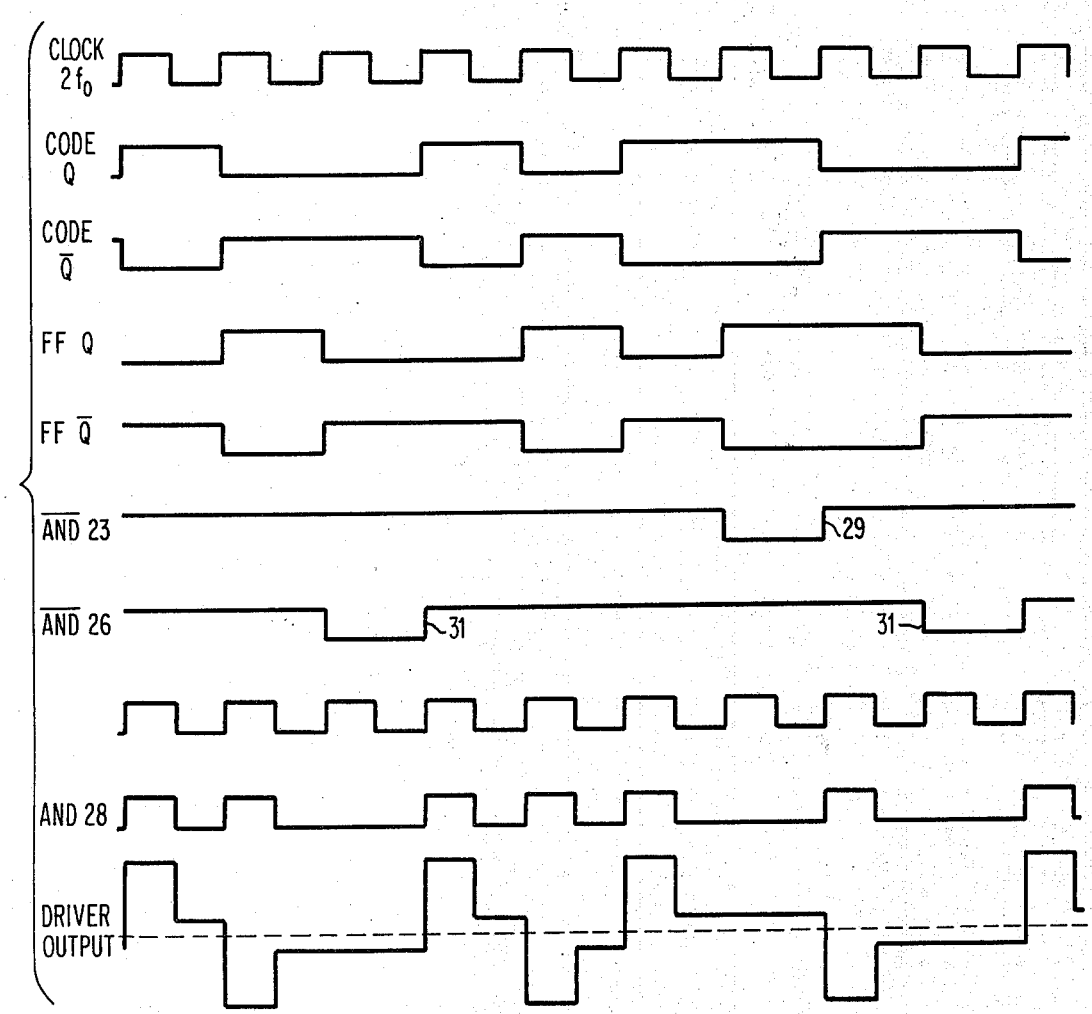
FIG. 6 is a timing diagram useful in understanding the operation of the logic and circuit diagram of FIG. 5.

Referring to the timing diagram of FIG. 6, the clock signal at a frequency $2f_0$ which is applied to the trigger input of flip-flop 22 and one input of AND gate 28 is illustrated at the top of the Figure. Code Q which is applied at terminal 21 to the set input of flip-flop 22 and AND gate 23 is illustrated as the second waveform. The opposite or inversion of code Q designated as code Q̄ is illustrated just below. The operation of flip-flop 22 is such that it is set in coincidence with the clock pulses when the bipolar code Q is at a high level or on the trailing edge of the bipolar code. The flip-flop 22 is reset in coincidence with the clock pulses when the bipolar code is at a low level or on the leading edge of the bipolar code. This operation is illustrated by the waveforms designated as FFQ and FFQ̄ representing the true and not true outputs of flip-flop 22. The outputs of flip-flop 22 are used to gate the code and its inverse in AND gates 23 and 26. Specifically, the code Q and the true output of flip-flop 22 produce a negative going gating signal 29 at the output of AND gate 23. Note that this is the inversion of the true output of AND gate 23. In a similar manner, the inversion of the code Q, that is, code Q̄, and the not true output of flip-flop 22 produce the output gating signals 31 of the AND gate 26. Note again that these are negative going or the not true outputs of AND gate 26. The negative going signals 29 and 31 from AND gates 23 and 26, respectively, may be considered as inhibiting signals which control the passage of the clock signal through AND gate 28. The effect of this is illustrated in FIG. 6 which shows the output of AND gate 28.

The output of AND gate 28 is connected to one side of a collector resistor R2. Transistors T10 through T16 represent a switchable current source. Such current sources are in common use in today's integrated circuits. The collector and base of transistor T16 are connected in common to the junction of AND gate 28 and the collector resistor R2. The emitter of transistor T16 is connected to ground through resistor R16, while the emitters of transistors T10 through T15 are connected to ground through resistors R10 through R15, respectively. If a current I flows through the diode-connected transistor T16, nearly equal currents I flow through each of the other six transistors, all of which have a common base with transistor T16. Thus the common collector junction 32 of transistors T10 through T15 will sink a current approximately six times the current of transistor T16. The amount of current flowing through T16 is determined by the value of the resistor R2, and this current is switched by the output of AND gate 28. The operation of AND gate 28 is such that when the output is at a low level, it will divert essentially the entire R2 current to ground by-passing transistor T16.

The current source comprising transistors T10 through T16 drives a push-pull line driver. The current drive provided by the transistors T10 through T16 is a peak current as will be clear from the description of the driver operation. In addition to the peak current source, there is a parallel steady-state current source represented by the transistors T5, T6 and T7. The base of transistor T5 is connected in common with its collector through resistor R1 to a source of positive potential. The emitter of transistor T5 is connected through resistor R3 to ground, while the emitters of transistors T6 and T7 are connected through resistor R4 to ground. The collectors of transistors T6 and T7 are connected in common to the common junction 32. As in the peak current source, the bases of transistors T6 and T7 are common with the base of transistor T5. The common junction 32 is connected to the emitters of transistors T1 and T2 which are current steering transistors. The collectors of transistors T1 and T2 are connected to opposite ends of a center tapped primary winding of transformer 33. The center tap of the primary winding of transformer 33 is connected to a source of positive voltage and through a decoupling capacitor C2 to ground. If the base voltage on transistor T2, for example, is sufficiently higher than on the base of transistor T1, all the current, both peak and steady-stage, will flow through transistor T2 and the left section of the transformer primary, generating a more positive voltage on the output terminal 34 when referenced to output terminal 35 of the secondary winding of transformer 33. With transistor T1 conducting and transistor T2 off, the output polarity at output terminal 34 and 35 is reversed.

The bivalue vode wave Q and Q is connected to the circuitry which drives the bases of transistors T1 and T2. More specifically, the code Q applied at input terminal 21 is connected to the emitters of transistors T9 and T18, and the inverse of the code Q is applied to the emitters of transistors T8 and T17. Each of the transistors T8, T9, T17 and T18 are diode-connected, i.e., their base and collector junctions are connected in common. The collector of transistor T9 is connected to the base of transistor T4 and through a collector resistor R6 to a common junction 34. In a similar manner, the collector of transistor T8 is connected to the base of transistor T3 and through a collector resistor R7 to the common junction 34. The collector of transistor T18 is connected in common to the base of transistor T2 and the emitter of transistor T4, while the collector of transistor T17 is connected in common to the base of transistor T1 and the emitter of transistor T3. The collectors of transistors T3 and T4 are both connected to a source of positive potential. The common junction 34 is connected also to a source of positive potential through series connected resistor R5 and diode-connected transistors T19 and T20. Diode connected transistors T19 and T20 and resistor R5 are used to limit the maximum positive swing at the base of transistors T1 and T2 in order to avoid saturation. Transistor T3 and T4 are emitter followers and provide the considerable base drive current required for the current steering transistor T1 and T2. Transistors T8 and T9 in diode connection disconnects the emitter followers in the output of the code source from the driver. This may be required where the code source up-level is not well controlled and may rise too high. Transistors T17 and T18 provide a sufficient voltage drop to avoid shunt currents from transistors T3 and T4 into the code source outputs at the down level. Resistors R8 and R9 connected across the secondary winding and the primary winding, respectively, provide a match for the external transmission line. The capacitor C1 connected across the primary winding is used to smooth the waveform and reduce possible radiation.

In operation, the code and its inverse Q and Q control steering transistors T1 and T2. The output of AND gate 28 controls the peak current source comprising transistors T10 through T16 when the Code Q is at a high level, transistor T2 will conduct a peak current for the duration of one clock pulse. The steady-state current source comprising transistor T5 through T7 provides the low level pedestal for the duration of the output signal. When the inverse of the code Q is at a high level, transistor T1 will conduct a peak current for the period of one clock pulse and thereafter the steady-state current source provides the low pedestal for the duration of the output signal. This operation is illustrated by the waveform at the bottom of FIG. 6.

Figure 7A:
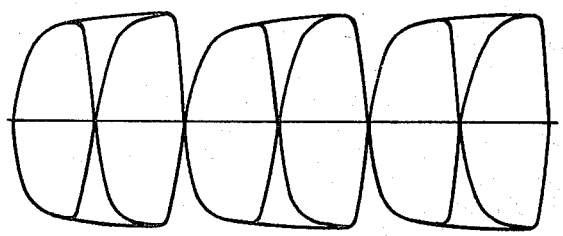
FIGS. 7a through 7f are illustrations of oscillographs of a bipolar waveform without predistortion along varying lengths of a transmission line.
Figure 7B:
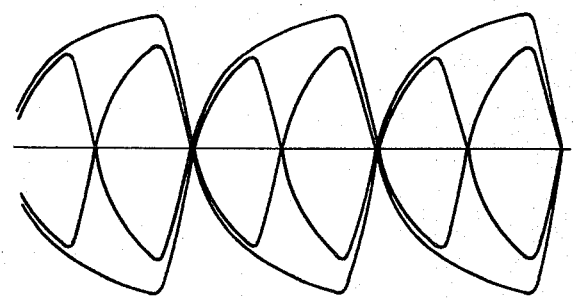
Figure 7C:
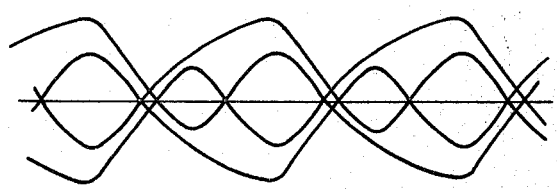
Figure 7D:
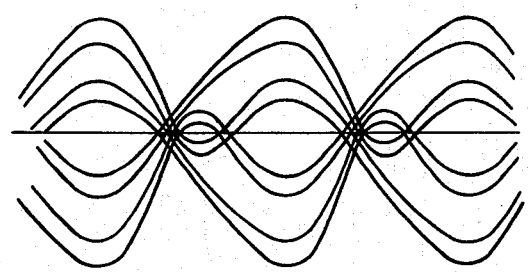
Figure 7E:
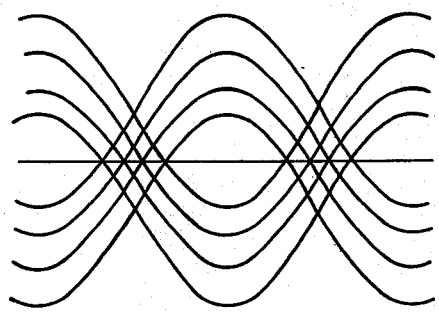
Figure 8E:
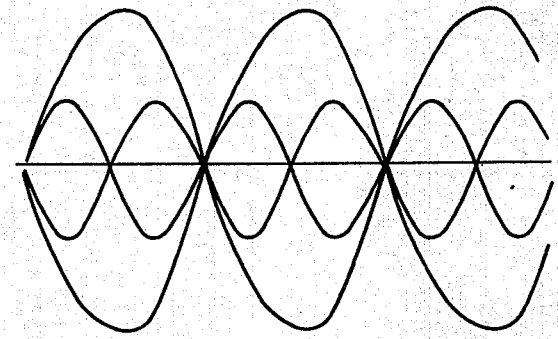
Figure 7F:
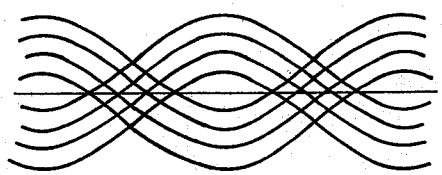
Figure 8F:
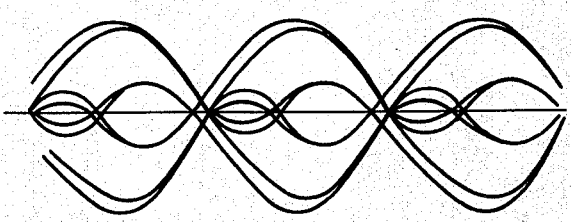

FIGS. 7a through 7f illustrate the line driver output without predistortion of a 1.39 Mbit/sec signal over varying lengths of 24 gauge twisted pair transmission line. Notice that at the end of 4,000 feet of transmission line as illustrated in FIG. 7e, one of the two small eyes has disappeared for the regular unequalized signal. In comparison, FIGS. 8a through 8f illustrate the signal on the transmission lines when subjected to predistortion according to the teachings of the invention. At all lengths of transmission line, the predistorted signal illustrated in FIGS. 8a through 8f does not need any further equalization. Heavier gauge wire like the common AWG22 in telephone exchange areas will, of course, allow transmission over longer distances.

It will be apparent that the embodiment shown is only exemplary and that various modifications can be made in construction and arrangement within the scope of the invention as defined by the appended claims. For example, while the circuit shown in FIG. 5 is intended to generate the waveform shown in FIG. 3, those skilled in the art will recognize that simple logic circuits can be implemented which generate the waveform shown in FIGS. 2 and 4 or, for the matter, any variation thereof depending upon the desired application.

I claim:

1. In a binary encoded data transmission system, an apparatus for predistorting the endoded wave form over a transmission line in a manner to minimize phase distortion due to the transmission line, said predistorting apparatus comprising:
   input means for accepting a source of bipolar signals comprising a sequence of short and long pulses having periods T and 2T, respectively, and representing a binary code,
   push-pull line driver means connected to said input means and controlled by said bipolar signals for driving said transmission line,
   gated electrical source means connected to said line driver means for intermittently supplying a first driving signal thereto,
   steady-state electrical source means connected to said line driver means for supplying a second driving signal thereto in the range of 20 to 50% of said first driving signal, and
   gating means connected to said input means and responsive to said bipolar signal for gating said gated electrical source means on for a time period less than or equal to T after each polarity reversal in said bipolar signal.

2. An apparatus as recited in claim 1 wherein said gating means includes:

timing means for establishing a timing period shorter than the period of a short pulse, and logic means responsive to said timing means for controlling said gated electrical source means at a predetermined time after the change in polarity of the original wave.

3. An apparatus as recited in claim 1 wherein said gating means comprises:

a source of clock pulses having a frequency $Nf_0$ wherein $N$ is an integer greater than 1 and $f_0$ is the code frequency, and bistable means having as inputs said bipolar signals and said clock pulses, said bistable means being set on the coincidence of a transition of said bipolar signals and a clock pulse and thereafter reset on the next succeeding clock pulse.

4. An apparatus as recited in claim 3 wherein said gating means further comprises:

coincidence means connected to the output of said bistable means and to said source of clock pulses for generating a control signal for controlling said gated electrical source means.

5. An apparatus as recited in claim 4 wherein said coincidence means comprises:

first AND gate connected to receive said bipolar signal and the true output of said bistable means, second AND gate connected to receive the inversion of said bipolar signal and the NOT true output of said bistable means, and third AND gate connected to receive said clock pulses and the inverted output of said first and second AND gates.

6. An apparatus as recited in claim 1 wherein said push-pull line driver means comprises:

a transformer having primary and secondary windings, said secondary winding being connected to said transmission line, said primary winding having a center tap connected to a source of reference potential, and first and second coupling means connected to opposite ends of said primary winding and in common to both said gated electrical source means and said steady-state electrical source means.

7. An apparatus as recited in claim 6 wherein both said gated electrical source means and said steady-state electrical source means comprise:

a diode-connected transistor having collector, base and emitter, said collector and base being connected in common, a collector resistor connected between the collector of said diode-connected transistor and a source of potential, the output of said gating means being connected to the junction of the collector of said diode-connected transistor and said collector resistor in said gated electrical source means, an emitter resistor connected between the emitter of said diode-connected transistor and a potential reference, and a plurality of current-sinking transistors each having collector, base and emitter, the bases of all of said current-sinking transistors being common to the base of said diode-connected transistor, the collectors of said current-sinking transistors being connected in common to said first and second coupling means.

\* \* \* \* \*

UNITED STATES PATENT AND TRADEMARK OFFICE
CERTIFICATE OF CORRECTION

PATENT NO. : 3,980,826
DATED : September 14, 1976
INVENTOR(S) : Albert Xavier WIDMER It is certified that error appears in the above-identified patent and that said Letters Patent are hereby corrected as shown below:

Column 3, line 1 - delete "inn" and insert -- in --

Column 4, line 5 - delete "Q" and insert -- $\overline{Q}$ -- line 6 - delete "Q" and insert -- $\overline{Q}$ -- line 17 - delete "Q" and insert -- $\overline{Q}$ -- line 24 - delete "FFQ" and insert -- $FF\overline{Q}$ -- line 32 - delete "Q" (second occurrence) and insert -- $\overline{Q}$ -- line 66 - delete "a" and insert -- the --

Column 5, line 29 - delete "vode" and insert -- code -- line 29 - delete "Q" (second occurrence) and insert -- $\overline{Q}$ -- line 34 - delete "Q" and insert -- $\overline{Q}$ --

Column 6, line 3 - delete "Q" and insert -- $\overline{Q}$ -- line 11 - delete "Q" and insert -- $\overline{Q}$ -- line 40 - delete "the" and insert -- that --

Signed and Sealed this

Twenty-third Day of November 1976

[SEAL]

Attest:

RUTH C. MASON
*Attesting Officer*

C. MARSHALL DANN
*Commissioner of Patents and Trademarks*